Nov. 19, 1935. L. R. EVANS 2,021,231

KEY BOLT

Filed Nov. 8, 1933

INVENTOR
Leigh R. Evans
by Parker, Crinchow & Farmer
ATTORNEYS

Patented Nov. 19, 1935

2,021,231

UNITED STATES PATENT OFFICE 2,021,231

KEY BOLT

Leigh R. Evans, Elmira, N. Y., assignor to Keybolt Appliance Company, Elmira, N. Y.

Application November 8, 1933, Serial No. 697,159

9 Claims. (Cl. 85—7)

This invention relates to joints between two overlapped parts and key bolts for use on such joints, and more particularly to means for preventing the loosening of the wedge or key after the same has been driven into its holding position in the bolt.

In ordinary use of key bolts on bolted joints, in order to facilitate the insertion of the bolt into holes in the parts to be connected thereby, the holes are usually considerably larger in diameter than the diameter of the bolt, this being particularly true when bolts are used on railroad track splices or joints. Under such circumstances, when the bolt is inserted through the holes and the wedge or key is driven into the slot in the bolt, the friction between the bolt and key will result in the moving of the bolt into a position in which its axis is at an angle to the axis of the holes through which it extends. During such shifting of the bolt out of axial alinement with the hole, the bolt swings about a portion of its head as the center. If, consequently, because of jars or vibrations, the bolt swings back into an axial position, the wedge or key will no longer be tight, and if an attempt is made to again drive the key farther into the slot in the bolt, the bolt will merely swing again out of its axial alinement with the holes through which it extends, so that it again will remain tight only until the bolt moves back into or near axial alinement with the holes.

The objects of this invention are to provide a bolted joint with a key bolt which is so constructed as to prevent shifting of the bolt out of axial alinement with the holes through which the bolt extends, during the driving of the wedge or key into wedging position in the slot of the bolt; also to provide a bolt of this kind with a projecting portion adapted to engage in the hole through which the bolt extends in such a manner as to hold the bolt in axial alinement with the hole during the driving of the wedge and without rendering the bolt difficult to insert into the hole therefor; also to provide a bolt of this kind which is particularly suitable for use in connection with railroad track joints; also to provide a wedge or key of improved construction for use in connection with bolts of this kind; also to provide a rail joint or splice of improved construction; also to improve the construction of key bolts in the other respects hereinafter described and set forth in the claims.

Figure 10:
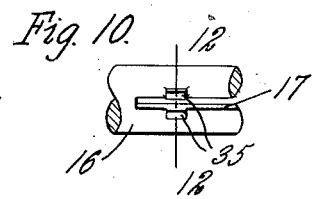
Figs. 10 and 11 are fragmentary longitudinal views of the shanks of key bolts having projections of other modified forms.
Figure 12:
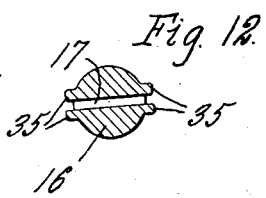
Figure 11:
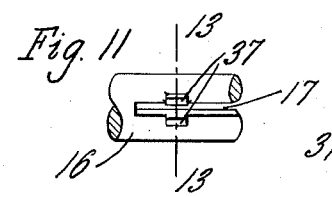
Figure 13:
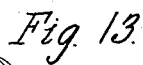

Figs. 12 and 13 are transverse sections thereof respectively on line 12—12, Fig. 10, and on line 13—13, Fig. 11.

A and B represent the end portions of two railroad rails which are connected together by means of fish plates C and D arranged at opposite sides of the rails. Each rail is provided with holes $a$ which are sufficiently larger than the diameters of the bolts used in the rail joint or splice so that the adjacent ends of the rails may move relatively to each other and to the fish plates and bolts when the rails expand or contract due to changes in temperature. The bolts used in the rail joint preferably extend through the joint alternately in opposite directions.

I have illustrated my invention for use in connection with the rail joints, but it will, of course, be understood that my improved key bolts can be used for other bolted joints, and it is not intended to limit this invention to use with rail joints.

Figure 1:
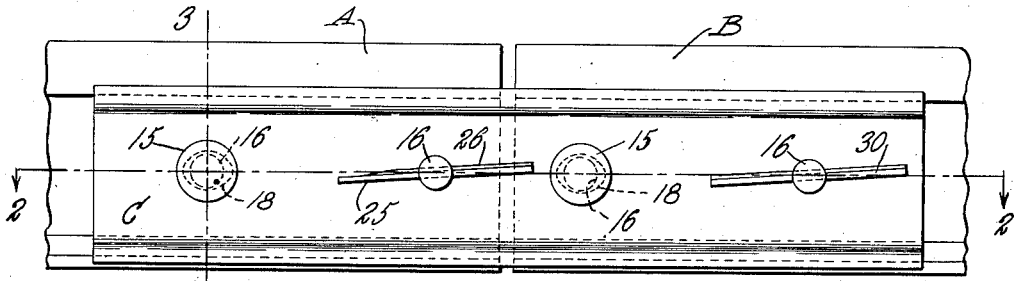
Fig. 1 is a side elevation of a bolted joint embodying this invention and showing my improved key bolts for use in forming the joint.

The key bolt includes a head 15, which may be of any suitable or desired form, and 16 represents the shank of the bolt, which is provided with the usual slot 17. Adjoining the head of the bolt, the shank is provided with a substantially elliptical enlarged portion 18 which cooperates with the usual elliptical hole in the fish plate so as to prevent the bolt from turning relatively to the rail joint. In the case of key bolts, it is preferable that the major axis of the elliptical portion 18 of the bolt is arranged at an angle to the slot 17 therein, a slight angle being sufficient for this purpose as shown in Fig. 1, and when the keys 20 are driven into the slots, they should be so placed that the smaller end of the wedge or key is lower than the larger end, so that in case a key becomes loosened, the vibration of the rail, for example, when a train is passing over the same, will not tend to cause the key or wedge to move out of the slot 17, but will tend to cause the key to move downwardly and more tightly into the slot in the bolt.

The keys 20 may be of the usual wedge-shaped form with the opposite faces lying in parallel planes, as is the case with the key shown at the extreme left of Fig. 2, but keys of other forms, for example, such as hereinafter described may be employed, if desired.

I have found that the movement of the key bolts out of axial alinement with the axis of the holes through which they extend, as heretofore pointed out, and which results in repeated loosening of the bolts as they are moved by vibrations or through other causes into axial alinement with the holes through which they extend, can be prevented by providing the bolts at the portions thereof which extend through the plate or member farthest removed from the head of the bolt, with enlargements which will cause the bolts to be rigidly held in axial alinement with the bolts through which they extend even when the wedge or key is being hammered into its gripping position. In the construction illustrated in Figs. 1 to 3, each bolt is provided with an annular bead 22 of greater diameter than that of the shank of the bolt. This bead may be of exactly the same or of slightly greater diameter than the diameter of the hole with which it is intended to cooperate. It is, of course, entirely impractical because of prohibitive expense to make the enlargements of the bolts of the exact diameter of the hole in the second fish plate through which the bolt passes. I consequently make the projections or enlargements of the bolts of greater dimension transversely of the axis of the bolt than the diameter of the last hole through which the bolt passes. This enlargement is also of relatively small dimension lengthwise of the bolt, so that this enlargement can be readily deformed when driven into its operative position, to reduce its transverse dimension to correspond to the diameter of the last bolt hole, and such a projection or bead on the bolt need not be formed with any great accuracy, since if it is of greater diameter than the diameter of the hole with which it is intended to cooperate, it can nevertheless be driven into such hole. After the bolt is partly inserted into the alined holes of the joint, it is customary to drive the bolt into its final position by means of a sledge hammer. The driving force of the blow will be sufficient to deform the bead or projection or swedge it into correct size to fit snugly within the hole in the fish plate. Consequently, while the key is being driven into its holding position by hammer blows on the larger or wider end of the key, the friction between the key and the slot in the bolt will not move the bolt in the hole in the fish plate. Consequently, after such key has been driven into the wedging position, the tendency of the key bolt to become loosened due to vibrations or jars is eliminated or at least very materially reduced, for the reason that no movement of the bolt relatively to the holes through which it extends is possible.

In order to prevent the keys of the bolt from becoming loosened or moving out of the slots in a direction reverse from that in which they are driven into the slots, I have provided keys which are so formed so as to frictionally engage with the side walls of the slot as well as with the end of the slot and the adjacent member of the joint. In the construction shown in Fig. 5, the key 25 is provided with a longitudinally extending bead or curved portion 26 in approximately the middle portion of the key, which bead terminates at a distance from the smaller end of the key. This bead makes it readily possible to insert the small end of the key into the slot sufficiently to permit driving of the key into locking position by means of a hammer. The distance between the outer edge of the convex face of the bead 26 and the opposite face of the key is preferably slightly larger than the width of the slot 17 in the bolt, so that the key will become wedged between the opposite side walls of the slot during the driving of the same into holding position, and this wedging prevents loosening of the key by movement of the same in a direction out of the slot. On the other hand, if it is desired to remove the key bolt, the key can easily be driven out of the slot by a hammer blow on the small end of the key. The key 25 is shown in Figs. 1 and 2 respectively in elevation and plan.

Figure 2:
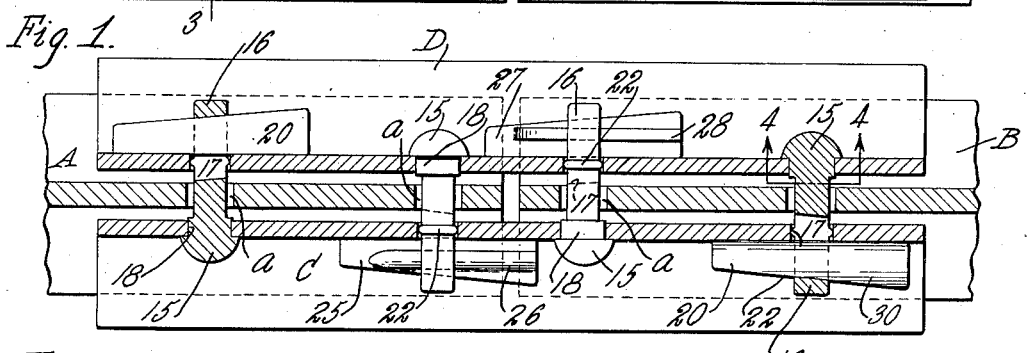
Fig. 2 is a sectional plan thereof, on line 2—2, Fig. 1.
Figure 6:
Figure 7:

Fig. 6 shows another modified form of a key in which the key 27 is provided with a rib 28 which preferably also terminates at a distance from the smaller end of the key as shown in the face view of this key in Fig. 2. Still another modified form is shown in Fig. 7, in which the key is bent or of arc-shaped cross section. In the case of this key 30, the curvature of the key may be continuous throughout the length of the key or it may terminate at a slight distance from the narrow end of the key, and in either case, the insertion of the key into the slot will be readily possible, since the arc at the narrow end of the key is shorter and therefore the distance between the outer portions of each face of the key will gradually increase toward the larger end thereof, so that a gradually increasing wedging action will result as the key is driven into the slot in the bolt.

Figure 5:
Figs. 5, 6 and 7 are end views of wedges or keys of various shapes for use in connection with key bolts.

By means of keys of the construction shown in Figs. 5 to 7, the keys have a tendency to expand the bolt at the slot, and this helps in maintaining the portion of the bolt in the last hole in tightly fitting relation therein, by preventing the inward deflection of the sides of the bolt into the slot. It is desirable, therefore, although not necessary, to use keys of this type with bolts having deformable enlargements to be driven into the hole nearest to the key.

Figure 3:
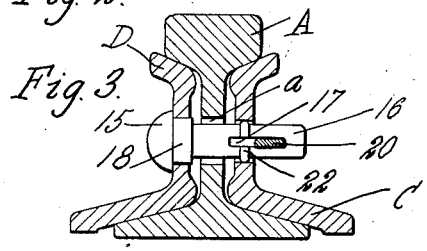
Fig. 3 is a transverse, sectional elevation thereof, on line 3—3, Fig. 1.

In order to hold the shank of the bolt in axial alinement with the holes through which it passes, it is not necessary to provide a bead continuously around the same as shown in Figs. 1 to 3, since movement of the shank of the bolt relatively to the axis of the hole may be prevented by providing on the shank of the bolt projections at diametrically opposite sides of the bolt. In the construction shown in Figs. 8 and 9, projections or lips 32 may be formed at opposite sides of the bolt by subjecting the shank of the bolt while hot to the action of dies to force a portion of the metal of the shank of the bolt outwardly beyond the normal periphery of the bolt, thus leaving recesses or depressions 33 in the shank of the bolt adjacent to the projections 32. The projections 32 will serve to prevent displacement of the shank of the bolt out of axial position due to the driving of the key into the slot and this driving of the key will, of course, not tend to move the shank of the bolt in a direction transversely of the length of the key. Furthermore, by having the lips 32 tightly wedged or driven within the hole of the fish plate, displacement of the shank of the bolt at right angles to the length of the key will also be prevented by these lips.

Figures 8, 9:
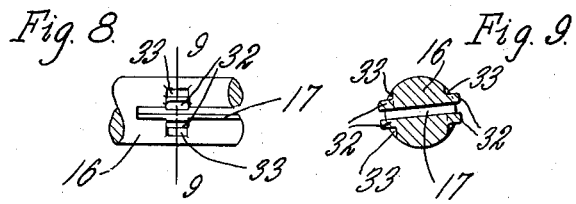
Fig. 8 is a fragmentary longitudinal view of the shank of a key bolt having projections of modified form for maintaining the bolt in axial alinement with the axis of the hole through which the bolt extends.
Fig. 9 is a transverse section thereof, on line 9—9, Fig. 8.
Figure 4:
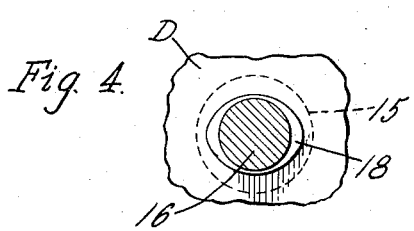
Fig. 4 is a fragmentary sectional view thereof, on line 4—4, Fig. 2.

Another modified form of bolt is shown in Figs. 10 and 12, in which lips 35 are formed integral with the shank of the bolt during the forging of the bolt without forcing any of the metal of the shank of the bolt outwardly as in the construction shown in Figs. 8 and 9. The reaction of the lips or projections 35 is identical with that of the lips 32.

In Figs. 11 and 13 are shown lips or projections 37 arranged at one side only of the shank of the bolt, preferably at the side thereof opposite to that from which the key is driven into the slot. The lips or projections 37 will serve to prevent the swinging of the shank of the bolt out of its axial alinement with the axis of the hole through which the bolt extends. After the key is tightened, the swinging of this bolt in a direction opposite to that in which the key is driven is, of course, impossible since such swinging would tend to tighten the bolt against the members of the joint.

The key bolt described has the advantage that by means of the beads or lips described, the shank of the bolt is held in axial alinement with the holes through which it passes during the driving of the wedge or key into its operative position and this effectively eliminates one of the main causes of loosening of key bolts. The arrangement of the lips or projections, furthermore, is such that they do not in any way interfere with the clearance between the shank of the bolt and members of the joint. For example, in the rail joint shown, the projections on the bolt do not reduce the clearance between the bolt in the hole *a* in the rail so that the rail has the same freedom of movement relatively to the fish plates and the bolts as it would have if these projections were not provided. By providing a bead or projection of relatively small size, no difficulty is experienced in positioning the key bolts in the holes since even if the portion of the shank of the bolt on which the beads or lips are formed cannot be easily pushed into the hole in the fish plate with which it is intended to cooperate, a blow of a hammer on the head of the bolt to drive the same into its operative position will readily deform the beads or lips 22 so that this enlarged portion of the shank of the bolt will then fit very tightly into its hole in the fish plate.

It will, of course, be understood that the bolts may be provided with enlargements or projections on the shank portions thereof other than those illustrated to provide a tight fit of the shank portion of the plate in the hole in the fish plate farthest removed from the head of the bolt.

The wedges or keys illustrated in Figs. 5 to 7 inclusive, in addition to the advantages already stated, have a tendency to spread or deflect outwardly the portions of the bolt at opposite sides of the slot 17, due to the wedging fit of the opposite faces of the key in the slot, which tends to force the bead 22 or other projections on the same into still tighter engagement within the hole of the fish plate, thus still more securely holding the key bolt in place. The type of wedge or key described also prevents inward deflection of the portions of the bolt at opposite sides of the slot and the resulting loosening of the key bolt.

I claim as my invention:

1. In a rail joint between a rail and two fish plates provided with alined apertures, a key bolt extending through said apertures, the first fish plate adjacent to the head of said bolt being provided with a non-circular aperture, said bolt having an enlarged non-circular portion adjacent to the head thereof adapted to fit into said aperture to hold said bolt from turning therein, said rail and said other fish plate having apertures larger in diameter than the diameter of the shank of the bolt, said bolt being provided on the portion of the shank which extends into the aperture of said other fish plate with an integral projecting deformable part causing said portion of the bolt to be deformed when entering the aperture in said other fish plate to fit snugly within the aperture in said second fish plate, and a key extending through a slot of said bolt and engaging said other fish plate.

2. A key bolt including a slotted bolt, a wedge-shaped key adapted to be driven into the slot of said bolt, and a deformable enlargement on said bolt adjacent to said slot and which is deformed when driven into that portion of a hole into which said bolt is inserted which is nearest to said key, to hold said bolt against lateral movement during the driving of the key into said slot.

3. A key bolt including a slotted bolt adapted to extend through holes in a plurality of members for connecting the same, said slotted bolt being of materially less diameter than the diameter of said holes in said members and having a deformable portion projecting outwardly from the shank of the bolt at a distance from the head thereof and near the slot in said bolt and of greater dimension transversely of said hole than the diameter of said hole and which is deformed when said bolt is driven into said hole, to form a tight fit in a portion of said hole, and a key adapted to be driven into said slot for drawing said members together.

4. A key bolt including a slotted bolt, a wedge-shaped key adapted to be inserted into the slot of said bolt from one side thereof, and a deformable projection on the shank of said bolt on the side thereof opposite to that from which the key is driven into said slot and of sufficient size to cause said projection to be deformed when said bolt is driven into its operative position, to hold said bolt against movement in said hole during the driving of said key into its operative position.

5. A key bolt including a slotted bolt, a wedge-shaped key adapted to be inserted into the slot of said bolt, the shank of said bolt being provided with outwardly extending deformable projections at opposite sides of said slot and which are deformed while said bolt is driven into its operative position to hold said bolt against movement relatively to the hole through which it extends.

6. A key bolt including a slotted bolt provided on a portion of the shank thereof at opposite ends of the slot with deformable projections which are deformed when the bolt is driven into its operative position to form a tight fit in a portion of the hole into which the bolt is inserted, and a wedge-shaped key for driving into said slot to draw said bolt lengthwise, said key being shaped to engage opposite sides of the slot to assist in holding said projections in operative relation to the hole through which said bolt extends.

7. A key bolt including a slotted bolt, a wedge-shaped key adapted to be driven into the slot of said bolt, and a deformable enlargement on said bolt adjacent to said slot and which is deformed when driven into that portion of a hole into which said bolt is inserted which is nearest to said key, to hold said bolt against lateral movement during the driving of the key into said slot, said key having opposite edges converging to form a wedge and being formed to wedge itself between opposite sides of the slot in the bolt after initial insertion of said key into said slot.

8. A key bolt including a slotted bolt, a wedge-shaped key adapted to be driven into the slot of said bolt, and a deformable enlargement on said bolt adjacent to said slot and which is deformed when driven into that portion of a hole into which said bolt is inserted which is nearest to said key, to hold said bolt against lateral movement during the driving of the key into said slot, the greater portion of said key being of a thickness less than the width of the slot into which it enters, said key having a portion of greater thickness to cause the key to engage opposite sides of the slot.

9. A key bolt including a slotted bolt, a wedge-shaped key adapted to be driven into the slot of said bolt, and a deformable enlargement on said bolt adjacent to said slot and which is deformed when driven into that portion of a hole into which said bolt is inserted which is nearest to said key, to hold said bolt against lateral movement during the driving of the key into said slot, said key being of a thickness less than the width of said slot and being bent to form a portion thereof into curved cross section, to cause the key to engage opposite sides of said slot.

LEIGH R. EVANS.